United States Patent
Amano et al.

(10) Patent No.: US 10,955,809 B2
(45) Date of Patent: Mar. 23, 2021

(54) INDUSTRIAL CONTROLLER AND DATA SHARING METHOD OF INDUSTRIAL CONTROLLER

(71) Applicant: Hitachi Industrial Equipment Systems Co., Ltd., Tokyo (JP)

(72) Inventors: Takashi Amano, Tokyo (JP); Mitsuhiro Imai, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 0 days.

(21) Appl. No.: 16/487,538

(22) PCT Filed: Dec. 28, 2017

(86) PCT No.: PCT/JP2017/047400
§ 371 (c)(1),
(2) Date: Aug. 21, 2019

(87) PCT Pub. No.: WO2018/198439
PCT Pub. Date: Nov. 1, 2018

(65) Prior Publication Data
US 2019/0369588 A1    Dec. 5, 2019

(30) Foreign Application Priority Data

Apr. 27, 2017   (JP) .............................. JP2017-088962

(51) Int. Cl.
*G06F 9/445* (2018.01)
*G05B 19/05* (2006.01)
(Continued)

(52) U.S. Cl.
CPC ....... *G05B 19/056* (2013.01); *G05B 19/0426* (2013.01); *G05B 19/052* (2013.01);
(Continued)

(58) Field of Classification Search
None
See application file for complete search history.

(56) References Cited

U.S. PATENT DOCUMENTS

| 4,570,217 A * | 2/1986 | Allen ................... G06F 9/4881 700/83 |
| 2009/0276059 A1* | 11/2009 | Tone .................... G05B 19/052 700/7 |
| 2013/0006397 A1* | 1/2013 | Fukatsu ................. H04L 12/28 700/86 |

FOREIGN PATENT DOCUMENTS

| JP | 4-3205 A | 1/1992 |
| JP | 2000-132208 A | 5/2000 |

(Continued)

OTHER PUBLICATIONS

International Search Report (PCT/ISA/210) issued in PCT Application No. PCT/JP2017/047400 dated Mar. 20, 2018 with English translation (five pages).

(Continued)

*Primary Examiner* — Anna C Deng
(74) *Attorney, Agent, or Firm* — Crowell & Moring LLP

(57) ABSTRACT

According to one embodiment, a control program extracts variable names of the control program and generates an address map file and a header file. An information program is generated using the generated header file. The information program accesses a shared storage area using the address map file through a shared access unit and accesses data using shared variables.

5 Claims, 9 Drawing Sheets

(51) Int. Cl.
  *G05B 19/042* (2006.01)
  *G06F 9/44* (2018.01)
  *H04L 12/28* (2006.01)
(52) U.S. Cl.
  CPC ............... *G06F 9/44* (2013.01); *H04L 12/28* (2013.01); *G05B 2219/15118* (2013.01); *G05B 2219/23334* (2013.01)

(56) References Cited

FOREIGN PATENT DOCUMENTS

| | | |
|---|---|---|
| JP | 5079166 B1 | 11/2012 |
| JP | 2015-215865 A | 12/2015 |
| WO | WO 2007/110953 A1 | 10/2007 |

OTHER PUBLICATIONS

Japanese-language Written Opinion (PCT/ISA/237) issued in PCT Application No. PCT/JP2017/047400 dated Mar. 20, 2018 (five pages).

\* cited by examiner

*FIG. 3*

| SHARING | VARIABLE NAME | TYPE | ACCESS AUTHORITY |
|---|---|---|---|
| ✓ | var1 | INT | Read |
| ✓ | var2 | INT | Read |
| ✓ | var3 | LINT | Write |
| ☐ | var4 | DINT | Write |
| ☐ | var5 | DINT | Write |

PERIOD 10 ms

CANCEL

OK

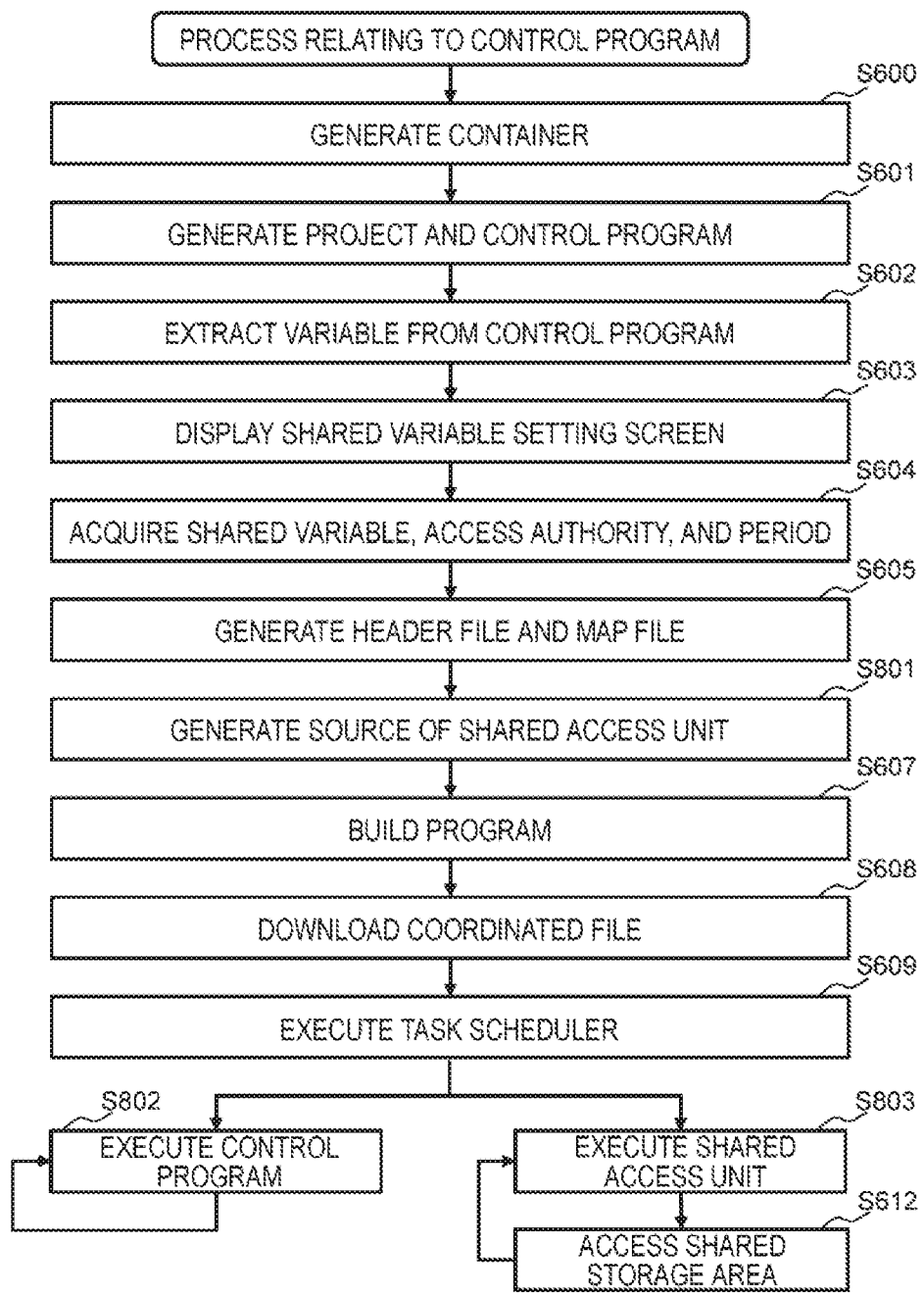

INDUSTRIAL CONTROLLER AND DATA SHARING METHOD OF INDUSTRIAL CONTROLLER

BACKGROUND OF THE INVENTION

1. Field of the Invention

The present invention relates to an industrial controller as a device incorporating a so-called programmable logic controller, and is particularly suitably applicable to a data sharing method of the industrial controller relating to a technique of sharing data in a shared storage area.

2. Description of Related Art

In general, when a high-level language program (hereinafter, referred to as "information program") is executed in a programmable logic controller, the information program cannot recognize a device such as a motor because an address of the device is unknown. Therefore, by manually assigning an address to a device, communication between a device of a programmable logic controller and a peripheral can be implemented (refer to Japanese Patent No. 5079166).

However, when the number of devices is large, it is difficult to execute the manual assignment in the first place.

SUMMARY OF THE INVENTION

The present invention has been made in consideration of the above-described points, and an object thereof is to provide an industrial controller in which development efficiency can be improved without requiring a manual assignment operation, and a data sharing method of the industrial controller.

In order to solve the problem, according to the present invention, an industrial controller, in which a control program for a control target device and an information program for executing a predetermined process share data using shared variables in a shared storage area, includes: a file generation unit that extracts variable information of the shared variables included in the control program and generates a map file relating to the shared storage area and a header file used during access to the shared storage area; and a program generation unit that generates the information program using the header file, in which the information program accesses the shared storage area using the map file.

In addition, according to the present invention, a data sharing method of an industrial controller, in which a control program for a control target device and an information program for executing a predetermined process share data using shared variables in a shared storage area, includes: a file generation step of causing the industrial controller to extract variable information of the shared variables included in the control program and to generate a map file relating to the shared storage area and a header file used during access to the shared storage area; a program generation step of causing the industrial controller to generate the information program using the header file; and a data access step of causing the information program to access the shared storage area using the map file.

According to the present invention, development efficiency can be improved without requiring a manual assignment operation.

BRIEF DESCRIPTION OF THE DRAWINGS

FIG. 3 is a diagram illustrating an example of a shared variable setting screen according to the first embodiment;

FIG. 9 is a flowchart illustrating an example of a process relating to the control program according to a second embodiment.

DESCRIPTION OF EMBODIMENTS

Hereinafter, one embodiment of the present invention will be described in detail with reference to the drawings.

(1) First Embodiment

(1-1) Hardware Configuration

Figure 1:
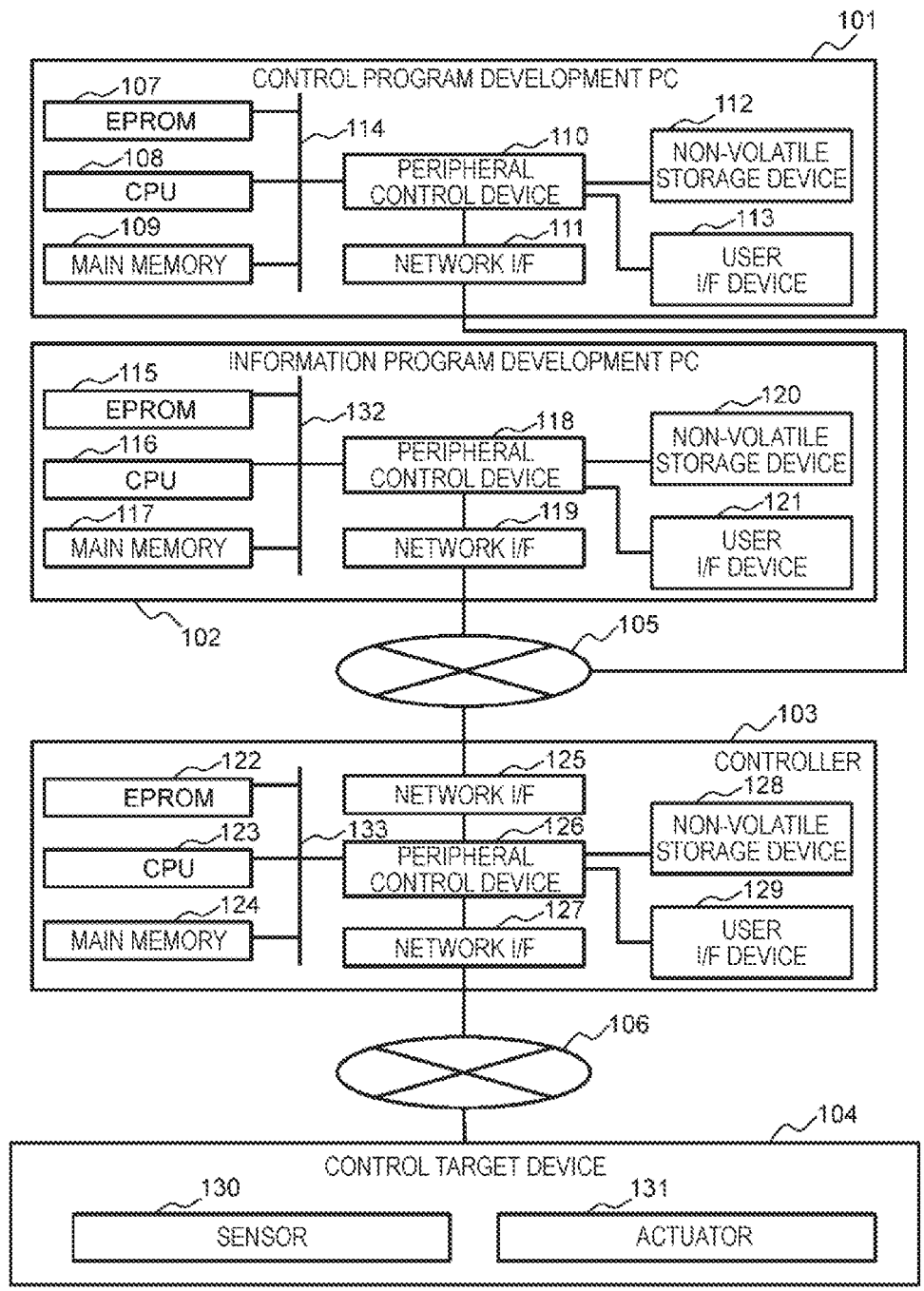
FIG. 1 is a diagram illustrating an example of a hardware configuration of an industrial controller and a program development environment according to a first embodiment.

FIG. 1 is a diagram illustrating an example of a hardware configuration of an industrial controller (hereinafter, also referred to as "controller") 103 and a program development environment according to a first embodiment. Basically, a control program development PC 101, an information program development PC 102, and the industrial controller (hereinafter, simply referred to as "controller") 103 have substantially the same hardware configuration, in which software corresponding to the purpose operates as described below.

A network 105 connects the control program development PC 101, the information program development PC 102, and the controller 103 to each other. A network 106 connects the controller 103 and a control target device 104 to each other.

The control program development PC 101 is a computer for developing a control program. The control program development PC 101 includes an EPROM 107, a CPU 108, a main memory 109, a peripheral control device 110, a network I/F 111, a non-volatile storage device 112, and a user I/F device 113.

The peripheral control device 110 connects various devices to each other through abus 114. The network I/F 111 is an interface for connection to the network 105. The non-volatile storage device 112 is a device that stores various programs or files. The user I/F device 113 is, for example, a device that allows a user to input required data.

The information program development PC 102 is a computer for developing an information program. The information program development PC 102 includes an EPROM 115, a CPU 116, a main memory 117, a peripheral control device 118, a network I/F 119, a non-volatile storage device 120, and a user I/F device 121.

The peripheral control device 118 connects various devices to each other through a bus 132. The network I/F 119 is an interface for connection to the network 105. The non-volatile storage device 120 is a device that stores various programs or files. The user I/F device 121 is, for example, a device that allows a user to input required data.

The controller 103 includes an EPROM 122, a CPU 123, a main memory 124, a peripheral control device 126, a network I/F 125, a network I/F 127, a non-volatile storage device 128, and a user I/F device 129.

The peripheral control device 126 connects various devices to each other through a bus 133. The network I/Fs 125 and 127 are interfaces for connection to the networks 105 and 106 corresponding thereto, respectively. The non-volatile storage device 128 is a device that stores various programs or files. The user I/F device 129 is, for example, a device that allows the user to input required data.

The controller 103 executes various operations and the like using the CPU 123 by loading an operating system (OS), various programs, and various files stored in the EPROM 122 or the non-volatile storage device 128 to the main memory 124.

The control target device 104 includes a sensor 130 and an actuator 131. The sensor 130 is a device such as a manual switch, a relay, a photoelectric switch, a proximity switch, a limit switch, a weight scale, a temperature sensor, a pressure sensor, a vibration sensor, an acoustic wave sensor, a flowmeter, a current meter, a gas sensor, a speed sensor, a tachometer, an ammeter, a voltmeter, a wattmeter, a water quality sensor, a color discrimination sensor, or a camera.

On the other hand, the actuator 131 is a device such as a motor, a power generator, a heater, a control valve, a cylinder, a solenoid, a lamp, a display unit, a buzzer, a speaker, a pump, a compressor, an air conditioner, a refrigerator, or a conveyor.

(1-2) Software Configuration

Figure 2:
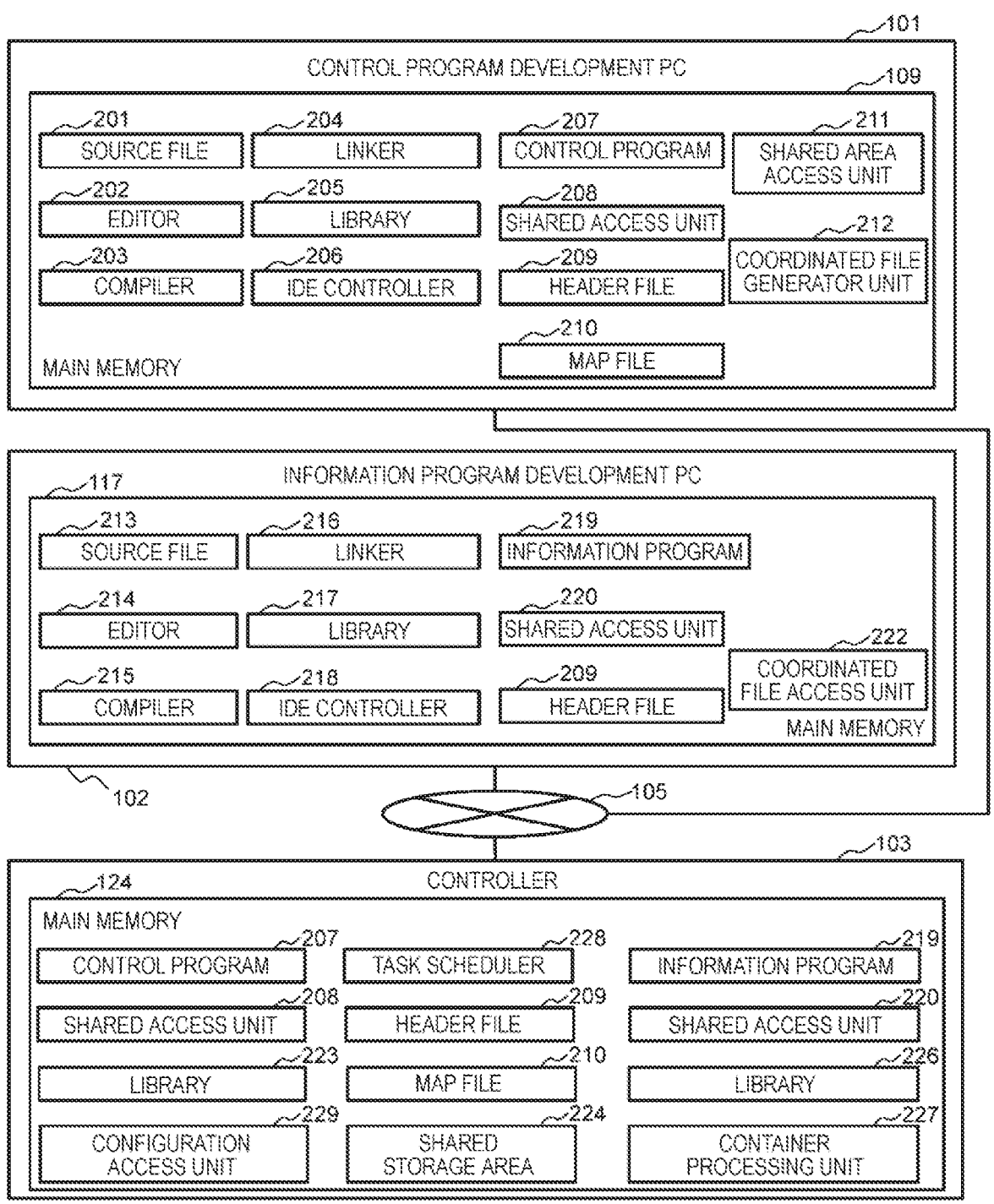
FIG. 2 is a diagram illustrating an example of a software configuration of the industrial controller and the program development environment according to the first embodiment.

FIG. 2 is a diagram illustrating an example of a software configuration of the controller 103 and the program development environment according to the first embodiment. In the example illustrated in FIG. 2, the control target device 104 of FIG. 1 is not illustrated.

In the embodiment, a case where a shared access unit 208 accesses a shared storage area 224 in the end of a task process that is executed by a control program 207 will be described as an example. When the control program includes a global variable, a task having the highest priority writes this global variable to the shared storage area 224.

(1-2-1) Control Program Development PC

First, the control program development PC 101 will be described. A source file 201 is a file in which a source code of the control program 207 is written. An editor 202 is a program for generating the source file 201. A compiler 203 generates an intermediate language file from the source file 201. A linker 204 combines an intermediate language file and a library 205 into an executable file. The library 205 is an intermediate language file that is prepared in advance in order to reuse a function of the program.

An IDE controller 206 is a program for controlling the editor 202, the compiler 203, the linker 204, and the like. The editor 202, the compiler 203, the linker 204, the library 205, and the IDE controller 206 will be collectively referred to as "integrated development environment (IDE) program".

Further, the control program development PC 101 includes the shared access unit 208, a header file 209, a map file 210, a shared area access unit 211, and a coordinated file generation unit 212. The shared area access unit 211 is a source file of the shared access unit 208 for allowing the control program 207 to access the shared storage area 224. The coordinated file generation unit 212 generates the header file 209 and the map file 210.

(1-2-2) Information Program Development Computer

Next, the information program development PC 102 will be described. A source file 213 is a file in which a source code of an information program 219 is written. An editor 214 is a program for generating the source file 213. A compiler 215 generates an intermediate language file from the source file 213. A linker 216 combines an intermediate language file and a library 217 into an executable file. The library 217 is an intermediate language file that is prepared in advance in order to reuse a function of the program.

The controller 103 may require data processing such as a complex arithmetic operation or information transmission and reception with a SCADA, a MES, or a cloud system. It may be difficult to program the data processing with a language unique to the above-described control device, and the data processing may be written using a programming language such as the C language or the Java (registered trade name) language used in the information communication field. A program for executing the data processing will be referred to as "information program". This information program corresponds to, for example, the information program 219.

An IDE controller 218 is a program for controlling the editor 214, the compiler 215, the linker 216, and the like. The editor 214, the compiler 215, the linker 216, the library 217, and the IDE controller 218 will be collectively referred to as "integrated development environment program".

Further, the information program development PC 102 includes a shared access unit 220, the header file 209, and a coordinated file access unit 222. The shared access unit 220 is a program for allowing the information program 219 to access the shared storage area 224. The coordinated file access unit 222 may acquire the header file 209 from the controller 103 or may transmit the information program 219 and the shared access unit 220 to the controller.

(1-2-3) Controller

On the other hand, the controller 103 will also be referred to as a sequence control device, a motion control device, or a programmable logic controller (PLC). The controller 103 executes a program in which the control details are written with a programming language unique to the control device, for example, a Ladder logic (LD language), a sequential function chart (FC language), a function block (FBD language), a structured text (ST language), or an instruction list (LD language).

A program for executing the control details will be referred to as "control program". Regarding the control program 207, a series of processes will be referred to as a task, and a period in which the processes are repeated can be set per task. As variables used in the control program 207, a dedicated input variable and a dedicated output variable are present. The controller 103 executes not only the control program. 207 but also the information program 219.

The shared access unit 208 is a program for allowing the control program 207 to access the shared storage area 224. A library 223 executes a process of a sharing function required for executing the control program 207 or the shared access unit 208. When the information program 219 accesses the shared storage area 224, the library 226 refers to the map file 210 and executes a process of an access function. A configuration access unit 229 may transmit the header file 209 to the coordinated file access unit 222 or may receive the information program 219 and the shared access unit 220 from the coordinated file access unit 222. A task scheduler 228 executes a task. The task executes programs registered in the task in the set period. When the control program 207 and the shared access unit 208 are registered in the task, the task executes the control program 207 and the shared access unit 208 in the execution period. The shared storage area 224 stores data of variables shared between the control program 207 and the information program 219. The shared access unit 220 accesses the shared storage area 224 through the library 226 for example, to read data to a structure 401 for reading of the information program 219 or to write data of a structure 402 for writing to a region at continuous addresses in the shared storage area 224.

The header file 209 is used when the coordinated file generation unit 212 generates the information program 219. The map file 210 is used when the information program 219 generated by the coordinated file generation unit 212 accesses the shared storage area 224.

A container processing unit 227 is a program used to prevent the control program 207 and the information program 219 from affecting each other.

(1-3) Shared Variable Setting Screen

FIG. 3 illustrates an example of a shared variable setting unit 301 as a shared variable setting screen according to the first embodiment. This shared variable setting unit 301 is a setting reception screen that is displayed by the control program development PC 101.

The shared variable setting unit 301 is a GUI (Graphic Use Interface) for setting variables shared with the information program 219 and is generated by the coordinated file generation unit 212. When a sharing check box 302 is checked, a variable shown in a variable name 303 is shared with the information program 219. When the sharing check box 302 is not checked, a variable shown in the variable name 303 is not shared with the information program 219. The variable name 303 shows the name of a variable shared with the information program. A type 304 is the type of a variable. A period 305 is a field for setting a period in which variable data shared in the shared storage area 224 is stored.

When a cancel button 306 is pressed, an operation in the shared variable setting unit 301 is canceled and terminated. On the other hand, when an OK button 307 is pressed, the header file 209 and the map file 210 are generated based on the set information. An access authority 308 shows an access authority is given to the information program. When the access authority 308 is "Read", the information program can read data of the variable corresponding to the variable name 303. When the access authority 308 is "write", the information program can write data of the variable corresponding to the variable name 303.

(1-4) Header File

Figure 4:
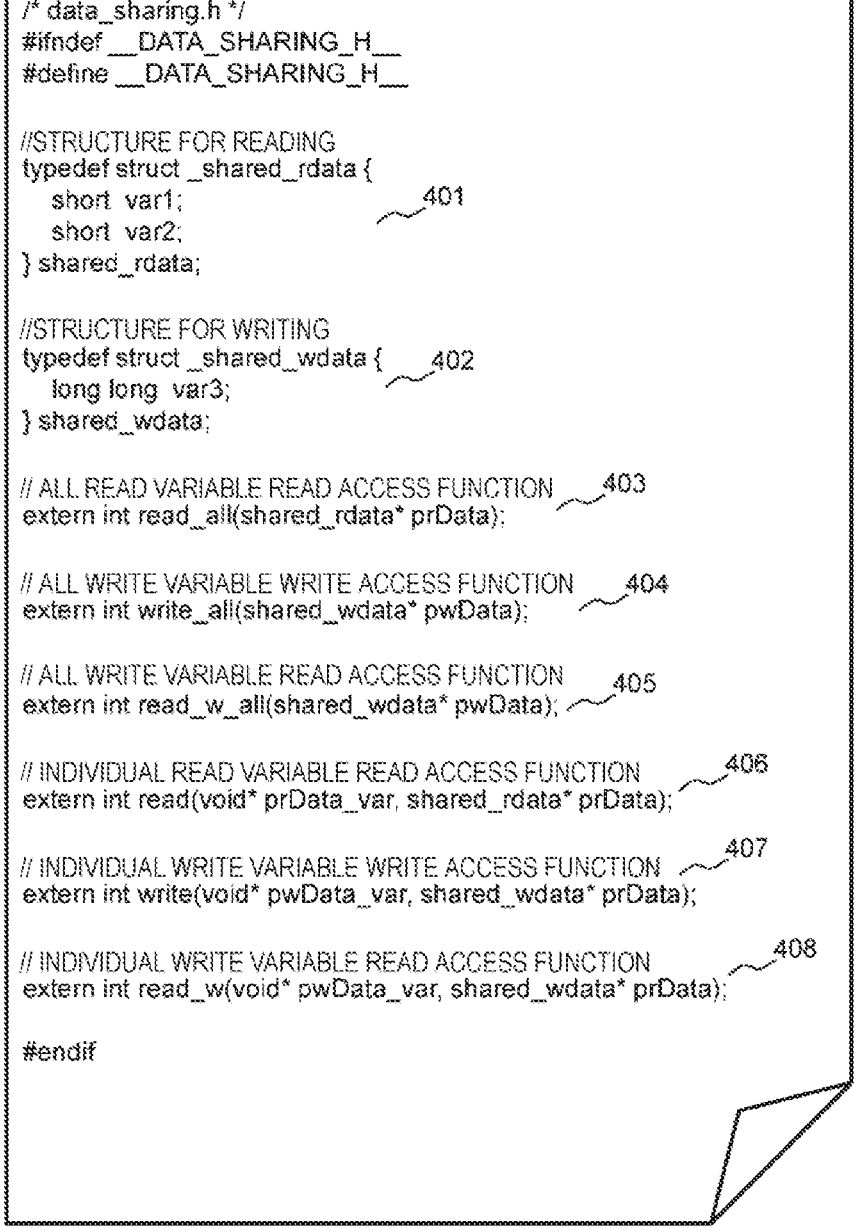
FIG. 4 is a diagram illustrating an example of a header file according to the first embodiment.

FIG. 4 illustrates an example of the header file 209 for generating the information program 219. The structure 401 for reading stores data that is read from a read offset value (read region) of the shared storage area 224 by the information program 219. The structure 402 for writing stores data to be written to a write offset value (write region) of the shared storage area 224 by the information program 219. In the header file, a declaration of a usable variable may be written with a programming language instead of the structure. When a variable to be shared is not present, a declaration of an access variable as a target is not written.

An all read variable read access function 403 is a function for allowing the information program 219 to read data of all the variables for reading. When the function is called, the data is read from the read region of the shared storage area 224 to prData. An all write variable write access function 404 is a function for allowing the information program 219 to write data of all the variables for writing. When the function is called, the data is written from pwData to the write region of the shared storage area 224. An all write variable read access function 405 is a function for allowing the information program 219 to read data of all the variables for writing. When the all write variable read access function 405 is called, the data is read from the write region of the shared storage area 224 to pwData. An individual read variable read access function 406 is a function for allowing the information program 219 to read data of an individual variable for reading. An individual write variable write access function 407 is a function for allowing the information program 219 to write data of an individual variable for writing to write region. An individual write variable read access function 408 is a function for allowing the information program 219 to read data of an individual variable for writing from the write region.

(1-5) Map File

Figure 5:
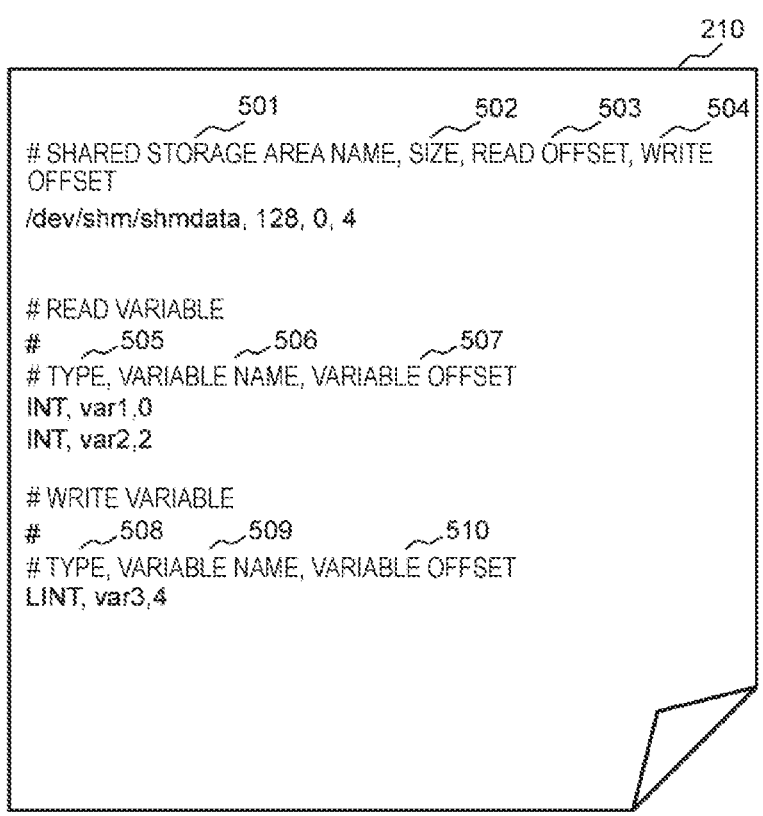
FIG. 5 is a diagram illustrating an example of a map file according to the first embodiment.

FIG. 5 is an example in which the map file 210 is generated in a CSV format. The map file 210 is used when the shared access unit 220 accesses the shared storage area 224.

A shared storage area name 501 is a name for identifying the shared storage area 224. For example, when the OS is Linux (registered trade name), a file is generated as the shared storage area, and thus an absolute path of a storage position of the file is set as the shared storage area name 501.

A size 502 is the size of data stored in the shared storage area 224. A read offset 503 shows a difference between a start address of the shared storage area 224 and a start address of a region where data to be read by the shared access unit 220 is stored.

A write offset 504 shows is a difference between the start address of the shared storage area 224 and a start address of a region where the shared access unit 220 writes data. A type 505 shows the type of data used in the control program 207 that is written to the shared storage area 224.

A variable name 506 shows the name of a variable used in the control program 207 that stores data to be written to the shared storage area 224. A variable offset 507 shows a difference between the start address of the region where data to be read by the shared access unit 220 is stored and a start address of a region where data of a variable as a target is stored. A type 508 shows the type of data used in the control program 207 that is read from the shared storage area 224.

A variable name 509 shows the name of a variable used in the control program 207 that stores data read from the shared storage area 224. A variable offset 510 shows a difference between the start address of the region where data to be read by the shared access unit 220 is stored and a start address of a region where data of a variable as a target is stored. Information of the variable offset 510 from the type 505 is used for accessing only an individual variable or is optionally used for adjustment of alignment of the structures. For example, when a plurality of information programs 219 are present and programming languages thereof are different from each other, a structure of a region where a member of a structure is stored may be different from the map file 210. In this case, the library 226 that is generated for a target language calculates an offset value according to the alignment of a structure of the target language and accesses the shared storage area 224. The size of a type may be stored in a conversion table between a type name and a size in the library 226 or may be written to the map file 210.

Figure 6:
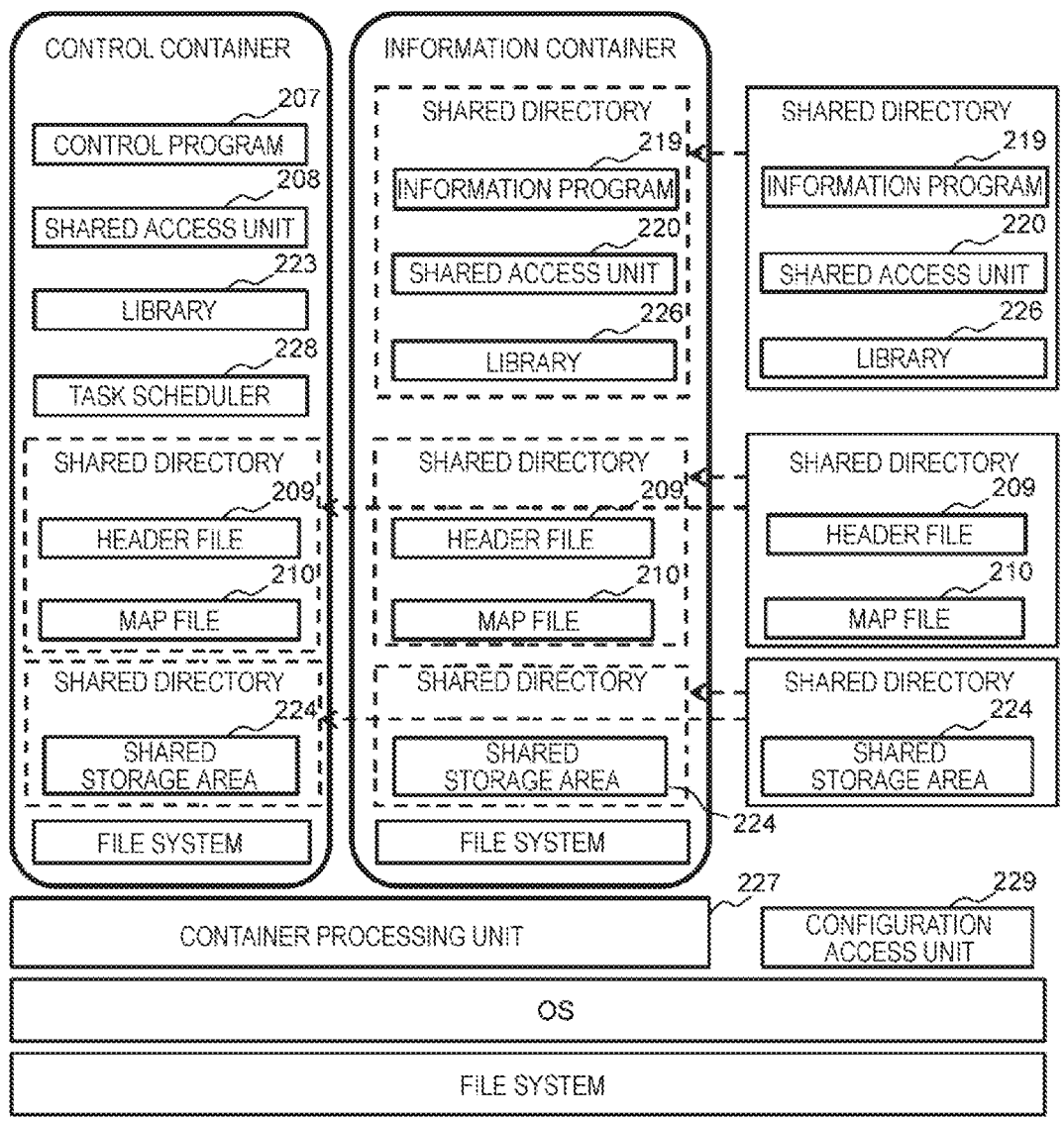
FIG. 6 is a conceptual diagram illustrating an example of containers according to the first embodiment.

FIG. 6 is a conceptual diagram illustrating a container for the control program 207 and a container for the information program 219. In the example illustrated in the drawing, components represented by the same reference numerals of those of FIG. 2 have substantially the same functions. Therefore, different points will be mainly described below.

The container processing unit 227 generates contains for the control program 207 and the information program 219 in order to prevent the control program 207 and the information program 219 from affecting each other.

Specifically, the container processing unit 227 generates namespaces of a process, a file system, and a network that are solely used for each of the control program 207 and the information program 219 and resources of the CPU 123 and the main memory 124.

In the embodiment, the container for the control program 207 will be referred to as "control container", and the container for the information program 219 will be referred to as "information container". A specific method of generating the container will be described in detail.

Figure 7:
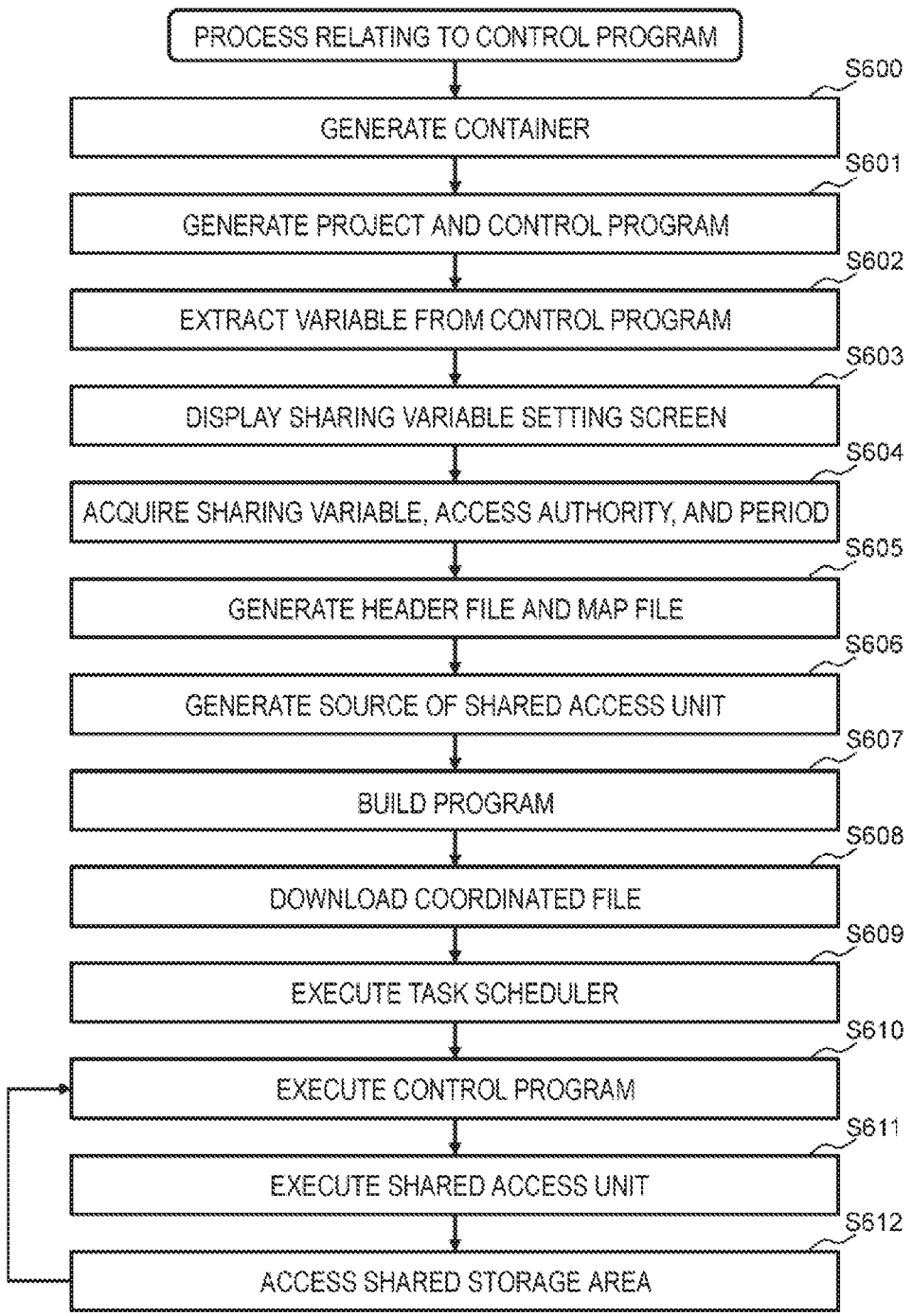
FIG. 7 is a flowchart illustrating an example of a process relating to a control program according to the first embodiment.

FIG. 7 illustrates an example of a process relating to the control program 207. First, in Step S600, as illustrated in FIG. 6, the container processing unit 227 generates the control container for the control program 207 and the information container for the information program 219.

In FIG. 6, the container processing unit 227 mounts (corresponding to dotted lines) a directory in which the shared storage area 224 is generated on file systems of the control container and the information container to generate a shared directory such that the shared directory can be accessed from the control program 207 and the information program 219. In addition, the container processing unit 227 also generates a shared directory for storing the header file 209 and the map file 210 and a shared directory for storing the information program 219 and the shared access unit 220. At this time, the container processing unit 227 mounts the latter shared directory only the file system of the information container to be shared. The control program 207 is executed in the control container, and the information program 219 is executed in the information container.

In Step S601, using the control program development PC 101, the user generates a project for collectively managing source codes using the above-described IDE and generates the control program 207. In Step S602, the user selects a corresponding menu in the above-described IDE in order to start the shared variable setting unit 301. When the menu is selected, the coordinated file generation unit 212 extracts variables from the source file 201.

In Step S603, the coordinated file generation unit 212 generates and displays the shared variable setting unit 301 (refer to FIG. 3). The user checks the sharing check box 302 of a variable shared with the information program 219 and sets the access authority 308 and the period 305. When the user presses the OK button 307 after the setting is completed, the coordinated file generation unit 212 stores the setting details in the memory.

In Step S604, the coordinated file generation unit 212 acquires the set values from the memory.

In Step S605, the coordinated file generation unit 212 generates the header file 209 and the map file 210. The coordinated file generation unit 212 defines a variable of which the access authority 308 is set as "Read" as the structure 401 for reading in the header file 209. Next, the coordinated file generation unit 212 defines a variable of which the access authority 308 is set as "Write" as the structure 402 for writing in the header file 209. The coordinated file generation unit 212 defines the all read variable read access function 403, the all write variable write access function 404, the all write variable read access function 405, the individual read variable read access function 406, the individual write variable write access function 407, and the individual write variable read access function 408 in the header file 209.

Next, the coordinated file generation unit 212 generates the map file 210 such that the information program 219 can access the shared storage area 224 using the structure of the structure variable defined in the header file 209. Specifically, the coordinated file generation unit 212 outputs the shared storage area name 501, the size 502 of a file generated with the shared storage area name, the read offset 503, and the write offset 504 to the map file 210. The coordinated file generation unit 212 generates the map file 210 for accessing the shared storage area 224 such that the variables set as "Read" can be stored and continuously the variables set as "Write" can be stored in order from the start address of the shared storage area 224. The coordinated file generation unit 212 calculates the size 502, the read offset 503, and the write offset 504 from the size of the structure defined in the header file 209. Next, the coordinated file generation unit 212 outputs the type 505, the variable name 506, and the variable offset 507 of the variable defined in the structure 401 for reading to the map file 210. Next, the coordinated file generation unit 212 outputs the type 508, the variable name 509, and the variable offset 510 of the variable defined in the structure 402 for writing to the map file 210. The coordinated file generation unit 212 calculates the variable offsets (507 and 510) in consideration of the definition order of the variable, the size of the variable, and the alignment of the structure of the information program 219 and outputs the calculated variable offsets.

In Step S606, the coordinated file generation unit 212 determines the name of the shared storage area 224, generates the shared storage area 224, and generates a source code (the shared area access unit 211) for allowing data of shared variables to access a storage region in the shared storage area 224. Specifically, based on the order of the variables of the structure defined in the header file 209 and the offsets output to the map file 210, the coordinated file generation unit 212 generates a source code for writing the data of the variables for reading set as "Read" in the shared variable setting unit 301 to the shared storage area 224 and a source code for reading the data of the variables for writing set as "Write" in the shared variable setting unit 301 from the shared storage area 224 to the variables of the control program 207.

The coordinated file generation unit 212 registers the control program 207 to the task and sets the period 305 as the execution period of the task. The execution period of the task may also be manually set by a control program developer or the like. The coordinated file generation unit 212 registers the shared access unit 208 that accesses the shared storage area 224 to the same task such that the shared access unit 208 is executed after the control program 207.

In Step S607, when the user selects an execution menu in the above-described IDE, the IDE controller 206 builds source codes to generate the control program 207 and the shared access unit 208.

In Step S608, the IDE controller 206 in the control program development PC 101 transmits the control program 207 and the shared access unit 208 to a position in the above-described control container other than the shared directory and transmits the header file 209 and the map file 210 to the shared directory in the control container.

In Step S609, the IDE controller 206 executes the task scheduler 228 of the controller 103. In Step S610, the task scheduler 228 executes the task such that the task executes the control program 207 in the set execution period. The control program 207 executes a control process. Once the task is started, the programs registered in the task are periodically executed. Therefore, the programs are not executed again by the task scheduler.

In Step S611, the task executes the shared access unit 208 after executing the control program 207. In Step S612, the shared access unit 220 designates the shared storage area name 501 and the size 502 while also using the process of the library 223, opens (accessible state) the shared storage area 224, and writes the data of the Read authority variables and reads the data of the Write authority variables based on the information output to the map file 210. Next, Step S610 is executed.

Figure 8:
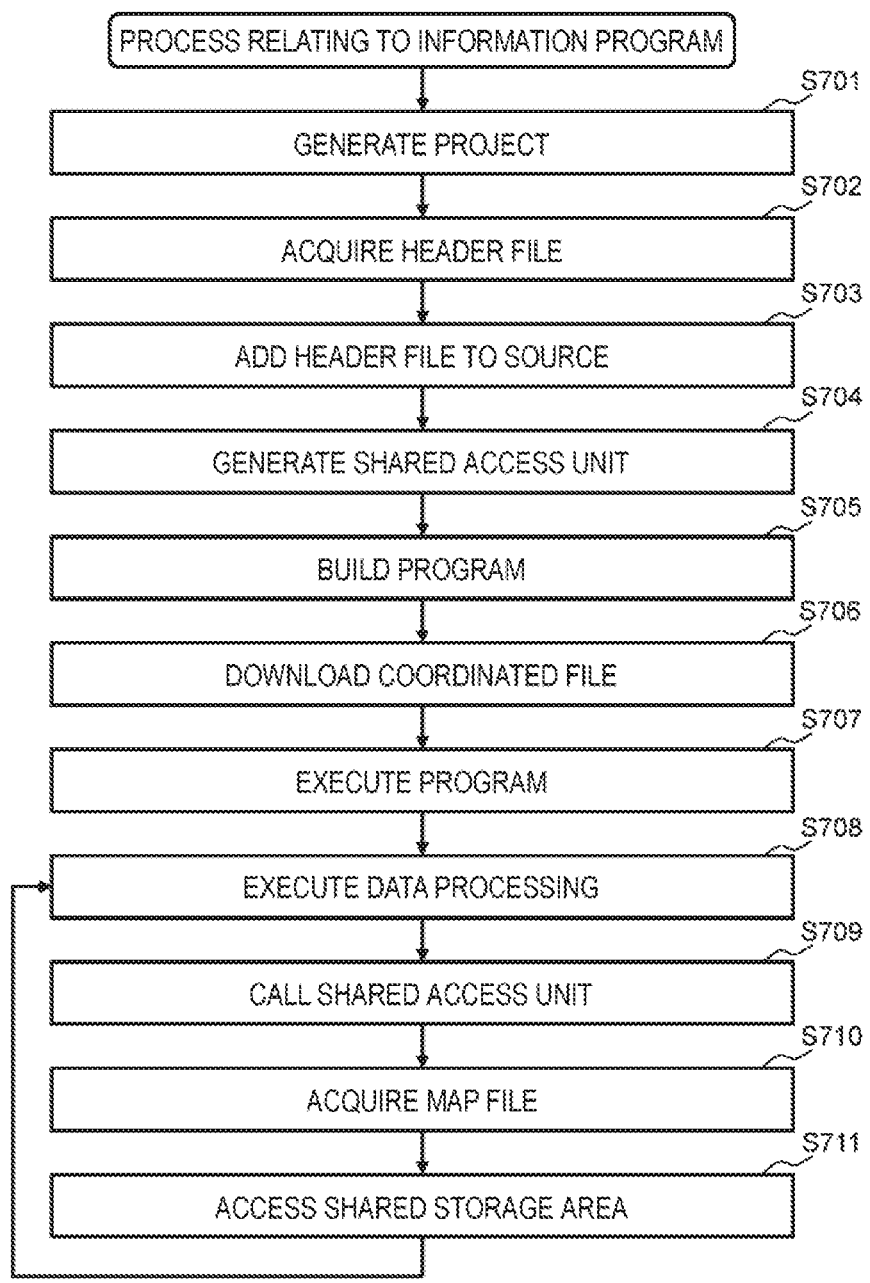
FIG. 8 is a flowchart illustrating an example of a process relating to an information program according to the first embodiment.

FIG. 8 illustrates an example of a process relating to the information program 219. In Step S701, the user executes a wizard to generate a project for collectively managing source codes using the above-described IDE.

In Step S702, when the wizard is executed, the IDE controller 218 executes the coordinated file access unit 222, communicates with the configuration access unit 229 of the controller 103, and acquires the header file 209.

In Step S703, the coordinated file access unit 222 inputs a declaration of the header file 209 to a position of a header file declaration unit of a file as a source code of the information program 219 and completes the generation of the project.

In Step S704, the user generates the information program 219 and a source code of the shared access unit 220 for accessing the shared storage area 224. The user generates a source code of the shared access unit 220 based on the functions defined in the header file 209.

In Step S705, when the user selects an execution menu in the above-described IDE, the IDE controller 218 builds source codes to generate the information program 219 and the shared access unit 220. The shared access unit 220 may be included in the information program 219.

In Step S706, the coordinated file access unit 222 transmits the information program 219 and the shared access unit 220 to the configuration access unit 229. When the configuration access unit 229 receives the information program 219 and the shared access unit 220, the container processing unit 227 may generate the information container. When the information program 219 is terminated, the container processing unit 227 may delete the information container. The configuration access unit 229 stores the information program 219 and the shared access unit 220 in the shared directory that can be accessed from the information container. In the embodiment, the information program 219 and the shared access unit 220 are stored in the information container through the configuration access unit 229. However, the coordinated file access unit 222 may communicate with a FTP server or the like in the information container to store the information program 219 and the shared access unit 220 in the information container. In Step S707, the IDE controller 218 logs into the information container, for example, by SSH connection to execute the information program 219.

In Step S708, the information program 219 executes data processing. In Step S709, the information program 219 executes the shared access unit 220. In Step S710, the shared access unit 220 calls the library 226 to execute the access function. The library 226 acquires the map file 210 from the shared directory. The library 226 stores a path name to acquire the map file 210 in advance.

In Step S711, the shared access unit 220 accesses the shared storage area 224 through the library 226.

(1-6) Access Method (1-6-1) All Read Variable Read Access

The library 226 acquires a start address of the structure 401 for reading from an argument of the function. The library 226 calculates a read data size from a difference between the write offset 504 and the read offset 503. The library 226 designates the shared storage area name 501, opens the shared storage area 224, reads data corresponding to the calculated size from the position of the read offset 503, and writes the read data in order from the acquired start address of the structure 401 for reading.

(1-6-2) All Write Variable Write Access

The library 226 acquires a start address of the structure 402 for writing from an argument of the function. The library 226 calculates a write data size from a difference between the size 502 and the write offset 504. The library 226 designates the shared storage area name 501, opens the shared storage area 224, reads data corresponding to the calculated size from the position of the start address of the structure 402 for writing, and writes the read data in order from the position of the write offset 504 of the shared storage area 224.

(1-6-3) All Write Variable Read Access

The library 226 acquires a start address of the structure 402 for writing from an argument of the function. The library 226 calculates a read data size from a difference between the size 502 and the write offset 504. The library 226 designates the shared storage area name 501, opens the shared storage area 224, reads data corresponding to the calculated size from the position of the write offset 504, and writes the read data in order from the acquired start address of the structure 402 for writing.

(1-6-4) Individual Read Variable Read Access

The library 226 acquires a start address of the structure 401 for reading and a start address of an individual variable from an argument of the function. The library 226 calculates a difference between the acquired addresses to calculate an offset value of the individual variable. The library 226 refers to the map file 210 and specifies the variable of the matched variable offset 507. The library specifies the size from the type 505 of the specified variable. The library 226 designates the shared storage area name 501, opens the shared storage area 224, reads data corresponding to the specified size from a position at a distance of the calculated offset from the position of the read offset 503, and writes the read data in order from the acquired start address of the individual variable.

(1-6-5) Individual Write Variable Write Access

The library 226 acquires a start address of the structure 402 for writing and a start address of an individual variable from an argument of the function. The library 226 adds a difference between the acquired addresses and the write offset 504 to calculate an offset value of the individual variable. The library 226 refers to the map file 210 and specifies the variable of the variable offset 510 matched to the calculated offset value. The library 226 specifies the size from the type 508 of the specified variable. The library 226 designates the shared storage area name 501, opens the shared storage area 224, reads data corresponding to the specified size from the start address of the individual variable, and writes the data read from the start address of the individual variable from a position at a distance of the calculated offset from the start address of the shared storage area 224.

(1-6-6) Individual Write Variable Read Access

The library 226 acquires a start address of the structure 402 for writing and a start address of an individual variable from an argument of the function. The library 226 adds a difference between the acquired addresses and the write offset 504 to calculate an offset value of the individual variable. The library 226 refers to the map file 210 and specifies the variable of the variable offset 510 matched to the difference. The library 226 specifies the size from the type 508 of the specified variable. The library 226 designates the shared storage area name 501, opens the shared storage area 224, reads data corresponding to the specified size from a position at a distance of the calculated offset, and writes the read data in order from the acquired start address of the individual variable.

Next, Step S708 is executed. A writing process of the shared access unit 208 and the library 226 to the shared storage area 224 is an atomic process that is continuous without being interrupted.

(1-7) Effects of Embodiment

According to the above-described configuration, variable information of the shared variables included in the control program 207 is extracted, and the map file 210 relating to the shared storage area 224 and the header file 209 used during access to the shared storage area 224 are generated. In addition, the information program 219 is generated using the header file 209. The information program 219 accesses the shared storage area 224 using the map file 210. This way, the same shared variable name is automatically generated between the control program 207 and the information program 219. As a result, it is not necessary for a manager to manually assign an address to a device as a control target device of the control program 209, and the development efficiency can be improved.

(2) Second Embodiment

In a second embodiment, the description of the same configurations and operations as those of the first embodiment will not be repeated, and different points will be mainly described. In the second embodiment, unlike the first embodiment, the shared access unit 208 is executed as a task different from the task of the control program 207 and accesses the shared storage area 224.

FIG. 9 illustrates an example of a process relating to the control program. In Step S801, the coordinated file generation unit 212 determines the name of the shared storage area 224, generates the shared storage area 224, and generates a source code (the shared area access unit 211) for allowing data of shared variables to access the shared storage area 224. The coordinated file generation unit 212 generates a shared access task different from the task of the control program 207, and sets the period acquired from the shared variable setting unit 301 as the execution period. The coordinated file generation unit 212 sets the execution priority of the shared access task to be lower than the priority of the task that is executed by the control program 207.

In Step S802, the task scheduler 228 executes the task such that the task executes the registered control program 207 in the set execution period. The control program 207 executes a control process. Next, Step S803 is executed. This task repeatedly executes the control program 207 in the set execution period. In Step S803, the task scheduler 228 executes the shared access task and executes the shared access unit 208 registered by the shared access task. Next, Step S612 is executed. This shared access task repeatedly executes Step S803 and Step S612 in the set execution period.

According to the above-described configuration, the shared access unit 208 that is independent from the task of the control program 207 accesses the shared storage area 224 in a state where the execution priority thereof is lower than that of the control program 207. Therefore, the influence of the control program 207 can be reduced.

(3) Other Embodiments

The embodiments are merely examples for describing the present invention, and the present invention is not limited to these embodiments. The present invention can be implemented in various forms within a range not departing from the scope of the present invention. For example, in the embodiments, the processes of various programs have been sequentially described, but the present invention is not limited thereto. Accordingly, unless the process result is consistent, the order of the processes may be switched, or the processes may be executed in parallel.

The present invention is widely applicable to an industrial controller as a device incorporating a so-called programmable logic controller and a data sharing method of the industrial controller.

What is claimed is:

1. An industrial controller in which a control program for a control target device and an information program for executing a predetermined process share data using shared variables in a shared storage area, the industrial controller comprising:
a file generation unit that extracts variable information of the shared variables included in the control program and generates a map file relating to the shared storage area and a header file used during access to the shared storage area; and
a program generation unit that generates the information program using the header file, wherein
the information program accesses the shared storage area using the map file, the program generation unit generates a shared access unit for accessing the shared storage area and generates the information program, the information program calls the shared access unit to access the shared storage area, and the map file includes:
- a shared storage area name for identifying at least one shared storage area to each other;
- a size of at least one shared storage area;
- a read offset that is a difference between a start address of at least one shared storage area and a start address of a region where data to be read by the shared access unit is stored;
- a write offset that is a difference between the start address of at least one shared storage area and a start address of a region where the shared access unit writes data;
- read variable information relating to a read variable among the shared variables; and
- write variable information relating to a write variable among the shared variables.

2. The industrial controller according to claim 1, wherein the header file includes:
- a variable declaration for reading that stores data read from the shared storage area by the information program;
- a variable declaration for writing that stores data to be written to the shared storage area by the information program; and
- an access function for allowing the information program to access the shared variables.

3. The industrial controller according to claim 1, further comprising:
- an information program development computer that is capable of developing the information program; and
- a control program development computer that is capable of developing the control program, wherein
- the control program development computer displays a screen capable of receiving a setting relating to the shared variables.

4. The industrial controller according to claim 1, further comprising
a container that separates the information program and the control program from each other.

5. A data sharing method of an industrial controller in which a control program for a control target device and an information program for executing a predetermined process share data using shared variables in a shared storage area, the method comprising:
- a file generation step of causing the industrial controller to extract variable information of the shared variables included in the control program and to generate a map file relating to the shared storage area and a header file used during access to the shared storage area;
- a program generation step of causing the industrial controller to generate the information program using the header file; and
- a data access step of causing the information program to access the shared storage area using the map file, wherein in the program generation step, the industrial controller generates a shared access unit for accessing the shared storage area and generates the information program, and the information program calls the shared access unit to access the shared storage area, and the map file includes:
- a shared storage area name for identifying at least one shared storage area to each other;
- a size of at least one shared storage area;
- a read offset that is a difference between a start address of at least one shared storage area and a start address of a region where data to be read by the shared access unit is stored;
- a write offset that is a difference between the start address of at least one shared storage area and a start address of a region where the shared access unit writes data;
- read variable information relating to a read variable among the shared variables; and
- write variable information relating to a write variable among the shared variables.

* * * * *